United States Patent Office 3,766,292
Patented Oct. 16, 1973

3,766,292
PROCESS FOR OBTAINING ISOPENTANE FROM BUTANE, HEXANE OR MIXTURES THEREOF
Robert G. Wall, Pinole, and Jacob D. Kemp, El Cerrito, Calif., assignors to Chevron Research Company, San Francisco, Calif.
No Drawing. Filed Nov. 23, 1970, Ser. No. 92,182
Int. Cl. C07c 9/00
U.S. Cl. 260—676 R
7 Claims

ABSTRACT OF THE DISCLOSURE

A process for obtaining relatively high yields of isopentane from an alkane feedstock which comprises contacting the feedstock at an elevated temperature in a reaction zone with a catalytic mass having (1) an alkane dehydrogenation component; (2) an olefin disproportionation component; and (3) an alkane isomerization component. The three components are separate and distinct catalyst components. Preferably, the alkane isomerization component contains a layered crystalline aluminosilicate.

BACKGROUND OF THE INVENTION

The present invention relates to both disproportionation and isomerization. More particularly, the present invention relates to alkane disproportionation and alkane isomerization; and still more particularly, the present invention relates to alkane disproportionation and isomerization carried out in the same reaction zone.

Isomerization is a well-known and frequently used step in petroleum refining. It enables the adjustment of the octane number upwards by converting normal paraffins, such as normal hexane, to isoparaffins, such as 2,3-dimethylbutane. A blend of various isomeric paraffins provides a gasoline which has a higher octane number than a gasoline consisting of normal paraffins. Isomerization is generally performed by passing isomerizable hydrocarbons together with hydrogen through a reaction zone containing an isomerization catalyst. The hydrogen to hydrocarbon mol ratio varies within a wide range, generally from 0.05:1 to 5:1, preferably within the range of about 0.5:1 to 2:1 for pentanes and hexanes and 0.1:1 to 1:1 for butanes. The reaction temperature will depend upon the specific hydrocarbons being isomerized and the nature and type of catalyst employed. Hydrocarbon streams consisting chiefly of pentanes and hexanes are usually isomerized at temperatures within the range of 200–900° F. The isomerization, normally effected under pressure, may be carried out in the liquid or vapor phase. Generally, pressures within the range of 300–1,000 p.s.i.g. have been used. A liquid hourly space velocity (LHSV), that is, the volume of liquid charged per hour per volume of catalyst, within the range of 0.5 to 10.0 and preferably within the range of about 0.75 to 4.0 is employed.

Various catalysts have been suggested for use in isomerization processes. In general, the isomerization can be effected at low temperatures (ca. 300° F.) with a Friedel-Crafts catalyst, such as aluminum chloride, or at high temperatures (ca. 750° F.) with a supported metal catalyst, such as platinum on halogenated alumina or silica-alumina. Thermodynamic equilibrium for isoparaffins is more favorable at low temperatures; however, the low temperature process has not received wide application because the Friedel-Crafts catalyst is quite corrosive and therefore expensive metals or alloys must be used. Of the high temperature isomerization processes, the noble metal catalysts such as platinum or palladium are perhaps considered to be the most effective.

Recently, catalysts comprising either natural or synthetic crystalline aluminosilicates have been suggested for isomerization processes. Included among the crystalline aluminosilicates which have been suggested are the type X and type Y silicates, mordenite, and layered aluminosilicates such as described in Granquist USP 3,252,757.

USP 3,507,931, titled "Isomerization of Paraffinic Hydrocarbons in the Presence of a Mordenite Catalyst" discloses the isomerization of straight run distillates rich in $C_4$–$C_6$ normal paraffins using a catalyst having a high silica to alumina ratio, preferably above 20:1, and operating the isomerization reaction at relatively low temperatures, such as 250–400° F.

U.S. Pats. 3,280,212 and 3,301,917 also disclose hydroisomerization processes using crystalline aluminosilicate type catalysts.

As indicated above, the present invention is directed to both isomerization and disproportionation.

The term "disproportionation" is used herein to mean the conversion of hydrocarbons to new hydrocarbons of both higher and lower molecular weight. For example, butane may be disproportionated according to the reaction:

$$2C_4H_{10} \rightleftharpoons C_3H_8 + C_5H_{12}$$

As can be seen from the above disproportionation reaction, the butane is in part converted to a higher molecular weight hydrocarbon, namely, pentane. Various processes have been suggested for converting hydrocarbons to higher molecular weight hydrocarbons.

U.S. Pat. 1,687,890 is directed to a process of converting low-boiling point hydrocarbons into higher-boiling point hydrocarbons by mixing a hydrocarbon vapor with steam and then contacting the steam-hydrocarbon mixture with iron oxide at temperatures in excess of 1,112° F. It is theorized in U.S. Pat. 1,687,890 that the following reactions may be involved to a greater or lesser extent:

(1) Paraffin hydrocarbons on being brought into contact with ferric oxide at elevated temperatures are oxidized or dehydrogenated, forming unsaturated hydrocarbons.

(2) Unsaturated hydrocarbons of low molecular weight polymerize into unsaturated hydrocarbons of higher molecular weight when subjected to elevated temperatures, the extent of polymerization depending upon the temperature and duration of treatment.

. . .

(7) Unsaturated hydrocarbons are hydrogenated by nascent hydrogen.

Another process which has been proposed for converting hydrocarbons to higher molecular weight hydrocarbons is olefin disproportionation. Numerous methods and catalysts have been disclosed for the disproportionation of olefins. In most of these processes, the olefin is disproportionated by contacting with a catalyst such as tungsten oxide or molybdenum oxide on silica or alumina at a temperature between about 150° and 1,100° F. and at a pressure between about 15 and 1500 p.s.i.a. These prior art processes have been directed to an effective method to convert essentially only olefins, not saturated hydrocarbons, to higher molecular weight hdyrocarbons by disproportionation.

For example, in U.S. Pat. 3,431,316, an olefin disproportionation process is disclosed, and it is stated that, if desired, paraffinic and cycloparaffinic hydrocarbons having up to 12 carbon atoms per molecule can be employed as diluents for the reaction; that is, the saturated hydrocarbons are non-reactive and merely dilute the olefins which are the reactants.

A process for the direct conversion of saturated hydrocarbons to higher molecular weight hydrocarbons would be very attractive because in many instances saturated hydrocarbons are available as a relatively cheap feedstock. For example, in many instances, excess amounts of propane and/or butanes are available in an over-all refinery operation.

Processes which have been previously reported wherein saturated hydrocarbons are disproportionated include contact of saturated hydrocarbons with solid catalyst comprised of $AlCl_3$ on $Al_2O_3$ and contact of saturated hydrocarbons with a catalyst comprising $BF_3$. The use of the $AlCl_3$ solid catalyst was uneconomic because, among other reasons, the catalyst was nonregenerable. The use of $BF_3$ was unattractive because of severe corrosion, sludge formation and other operating problems.

In the past it has been the practice to convert saturated hydrocarbons, particularly normal alkanes, to olefins as a separate or distinct step and then to disproportionate the olefins to valuable higher molecular weight hydrocarbons. For example, in U.S. Pat. 3,431,316, saturated light hydrocarbons are cracked to form olefins, and then the olefins are separated from the cracker effluent and fed to a disproportionation zone wherein the olefins are disproportionated to higher molecular weight hydrocarbons. Thus, a separate step is used to obtain olefins, because, according to the prior art, no economically feasible process is available for the direct disproportionation of saturated hydrocarbons.

USP 3,445,541 discloses a process for the dehydrogenation-disproportionation of olefins and paraffins, using a combined dehydrogenation and disproportionation catalyst. According to USP 3,445,541, a hydrocarbon feed which is either an acyclic paraffin or acyclic olefin having 3-6 carbon atoms is contacted with the catalyst at conditions of temperature and pressure to promote dehydrogenation and disproportionation. It is said that the process can be carried out at temperatures between 800° F. and 1,200° F.; however, the lowest temperature used for processing a paraffin in accordance with any of the examples of USP 3,445,541 is 980° F., and typically the temperature used is between 1,040° F. and 1,125° F.

The high temperature process disclosed in USP 3,445,541 is shown therein to result in only relatively low yields of saturated higher molecular weight hydrocarbons. The USP 3,445,541 process operates with a substantial amount of olefins in the reaction zone and thus with about 10 to 50 volume percent or more olefins in the effluent from the disproportionation reaction zone. Catalysts used in the process of USP 3,445,541 include chromia on alumina together with tungsten oxide on silica. Although chromia on alumina is recognized as having alkaline isomerization activity, it can be seen from Examples 6 and 8 (runs 19, 20 and 25) in USP 3,445,541 that little isomerization of normal butane to isobutane was obtained (the ratio of $iC_4$ to $NC_4$ usually being considerably less than 1).

SUMMARY OF THE INVENTION

According to the present invention, a process is provided for obtaining relatively high yields of isopentane from an alkane feedstock which comprises contacting the feedstock at an elevated temperature in a reaction zone with a catalytic mass having (1) an alkane dehydrogenation component, (2) an olefin disproportionation component, and (3) an alkane isomerization component.

An important aspect of the present invention is the use of three separate and distinct catalyst components for the three functions indicated above. Although the components can be composited, or combined, or mixed together in various manners to form the catalytic mass, the catalytic mass must contain at least the three components with no single component being used to serve two or more of the enumerated functions. Exemplary preferred components include platinum on alumina as component 1, tungsten oxide on silica as component 2, and a layered clay-type aluminosilicate containing a chromium promoter as component 3. Catalysts such as tungsten oxide on silica plus platinum and a halide on alumina are not suitable for reasons including the fact that the platinum-halide-alumina component would be attempted to be used both as component 1 and component 3.

Suitable feedstocks for the process of the present invention are alkanes, preferably alkanes from about $C_2$ up to about $C_{10}$. Particularly preferred feedstocks are butane-rich feeds and hexane-rich feeds. Butane feedstocks can be derived from various sources including the straight run distillation of crude oil. The hexane-rich feedstocks can also be derived from the straight-run distillation of crude oils. Both butane and hexane are particularly preferred feedstocks because they can be upgraded from a relatively low octane level, and in the case of butane, a relatively high volatility level, to a high octane-low volatility level by converting butane and/or hexane to isopentane in the reaction zone of the process of the present invention. Hexane-rich feedstocks obtained, for example, as a raffinate stream from catalytic reforming, are particularly suitable feedstocks for the present invention. The hexane is converted to isopentane and $C_7+$ hydrocarbons which in turn can be rerouted back to catalytic reforming as described in commonly assigned Ser. Nos. 51,459 and 51,488, both filed July 1, 1970, the disclosures of which applications are incorporated by reference into the present specification.

The catalytic mass used in the reaction zone in the process of the present invention preferably contains substantial activity for the dehydrogenation of alkanes as well as substantial activity for olefin disproportionation. Various catalysts are known according to the prior art for these two separate functions. Preferred dehydrogenation components include noble metals or noble metal compounds on a refractory support. Preferred olefin disproportionation components include tungsten, molybdenum and rhenium, particularly oxides of those metals and usually supported on an inorganic refractory carrier. Thus, preferred catalyst masses include platinum on alumina mixed with tungsten oxide on silica. Preferably, the catalytic mass is prepared by combining the components as a physical mixture of separately prepared components. Disproportionation of alkanes and particularly preferred operating conditions for the disproportionation of alkanes is discussed in commonly assigned applications Ser. No. 3,303 and Ser. No. 3,306, both filed on Sept. 16, 1970. The disclosures of these applications are incorporated by reference into the present application, particularly those portions of the disclosure relating to alkane disproportionation catalyst mass compositions and preferred reaction conditions. In the process of the present invention, particularly preferred reaction conditions include a temperature between about 400 and 950° F. and more preferably, a temperature between about 400 and 850° F. using, for example, a catalyst comprising platinum or alumina as component 1 and a Group VI-B metal or metal compound such as tungsten oxide on silica as component 2. Preferred operating pressure for the reaction zone is between about 100 and 1500 p.s.i.a.

Various known isomerization catalysts can be used as the alkane isomerization component, that is, as component 3 of the catalytic mass used in the process of the present invention. Catalysts comprising crystalline aluminosilicates such as molecular sieves, mordenite, and layered crystalline aluminosilicates are preferred. It is preferred to use one or more hydrogenation components with the crystalline aluminosilicate such as chromium, palladium or platinum. Catalysts containing crystalline aluminosilicate and a hydrogenation component are described in more detail in commonly assigned applications Ser. Nos. 776,733 and 839,999, which applications are incorporated by reference into the present specification. Particularly preferred aluminosilicate containing catalysts for use as component 3 are catalysts containing a layered clay-type aluminosilicate component. Preferably, the layered clay-type aluminosilicate is composed together with 0.05-15 weight percent chromium. In the present specification, oxides and other compounds of metals are to be considered as included in reference to a metal simply as an element, i.e., chromium includes the use of chromium in compound forms such as chromium oxide.

Layered aluminosilicates are preferred for use in component 3 of the catalytic mass of the present invention because of several advantages thereby obtained, particularly including the relatively high degree of isomerization activity at the relatively low temperature (850° F. or below and more preferably below 800° F.) which are preferred for alkane disproportionation using components 1 and 2.

EXAMPLES

Example 1

This example illustrates the relatively low amount of isomerization obtained using a catalyst which does not have component 3, i.e., the alkane isomerization component. The catalyst was a physical mixture of 0.74 grams of 42-60 mesh platinum lithiated alumina (0.5 weight percent platinum and 0.5 weight percent lithium) and 1.61 grams of 42-60 mesh tungsten oxide on silica (8 weight percent tungsten oxide) giving a catalyst volume of 5 milliliters. The catalyst was pretreated at 900° F. for 4 hours in 1 percent oxygen–99 percent nitrogen followed by 4 hours at 900° F. in hydrogen with both treatments carried out at atmospheric pressure.

A butane-hexane feed was then contacted with the catalyst at 760° F. and 900 p.s.i.g. at a feed rate of 5 milliliters per hour or a liquid hourly space velocity (LHSV) of 1. The feed composition was about 47.6 weight percent normal butane, 50.25 weight percent 2-methyl pentane and about 0.15 weight percent miscellaneous hydrocarbons. The results from this disproportionation run are shown in Table I below. As can be seen from Table I although about 30 percent $C_5$ was obtained, the ratio of isopentane to normal pentane was only about 1.

The selectivities shown in Table I were calculated by dividing the weight percent of a given product by the weight percent of the total feed converted to the products listed under the heading "Selectivities" (and multiplying by 100 to convert the fraction to a percentage).

TABLE I

| Run time (hrs.) | 2.4 | 7 | 10 | 13 | 16 |
|---|---|---|---|---|---|
| Weight percent: | | | | | |
| n-Butane converted | 46.93 | 42.88 | 37.62 | 38.00 | 35.86 |
| 2-methylpentane converted | 66.02 | 68.98 | 64.32 | 62.50 | 59.84 |
| Total feed converted | 57.67 | 57.23 | 52.39 | 51.65 | 49.30 |
| Selectivities (based on feed converted): | | | | | |
| Methane plus ethane | 3.14 | 2.90 | 2.79 | 2.63 | 2.47 |
| Propane | 20.37 | 22.68 | 22.33 | 21.66 | 21.20 |
| Isobutane | 7.14 | 6.52 | 6.47 | 6.29 | 6.21 |
| n-Pentane | 13.91 | 15.13 | 15.59 | 15.97 | 16.19 |
| Isopentane | 15.52 | 14.68 | 14.64 | 14.75 | 14.70 |
| 3-methylpentane | 5.74 | 4.33 | 4.43 | 4.51 | 4.54 |
| n-Hexane | 5.69 | 6.38 | 6.24 | 6.41 | 6.35 |
| Others [1] | 28.49 | 27.38 | 27.51 | 27.78 | 28.34 |
| Total pentanes | 29.43 | 29.81 | 30.23 | 30.72 | 30.89 |
| Isopentane/n-pentane | 1.12 | 0.97 | 0.94 | 0.92 | 0.91 |

[1] Largely hexanes and higher.

Example II

The catalyst used in this example contained a third component. The catalytic mass consisted of 2.5 milliliters of the mixed platinum-lithiated-alumina-tungsten oxide silica catalyst of the same composition as used in Example 1, plus 2.5 milliliters of 42-60 mesh chromium promoted layered aluminosilicate clay as the third component. Thus, the third component was an acidic alkane isomerization catalyst containing a layered aluminosilicate. The layered aluminosilicate was impregnated with 3.6 weight same as in Example 1. The $C_4$-$C_6$ feed composition was also the same and the feed was also contacted with the catalytic mass at a temperature of 760° F. and a pressure of 900 p.s.i.g. The feed rate was 2.5 milliliters per hour corresponding to a liquid hourly space velocity of 1 with respect to the platinum lithiated alumina-tungsten oxide-silica catalyst volume. Table II below lists the results obtained using the catalytic mass containing the three components. As can be seen from Table II, for example by comparing the isopentane to n-pentane ratio after two hours run time in Table I wherein only a 2-component catalyst was used, about 30–50 percent higher isopentane to normal pentane ratio is obtained using the three component catalyst. In both instances, the total amount of pentanes are essentially the same.

TABLE II

| Run time (hrs.) | 2 | 4 | 6 | 8 |
|---|---|---|---|---|
| Weight percent: | | | | |
| n-Butane converted | 40.06 | 42.16 | 37.35 | 32.83 |
| 2-methylpentane converted | 90.19 | 83.88 | 77.68 | 67.41 |
| Total feed conversion | 66.55 | 64.38 | 58.97 | 51.66 |
| Selectivities (based on feed converted): | | | | |
| Methane plus ethane | 9.57 | 6.99 | 6.29 | 5.22 |
| Propane | 36.60 | 30.82 | 30.52 | 25.25 |
| Isobutane | 16.14 | 11.46 | 10.70 | 8.34 |
| n-Pentane | 11.21 | 12.41 | 13.26 | 11.80 |
| Isopentane | 18.60 | 16.64 | 16.77 | 13.57 |
| 3-methylpentane | 4.64 | 6.24 | 7.22 | 7.27 |
| n-Hexane | 0.59 | 5.05 | 5.68 | 5.41 |
| Other [1] | 2.65 | 10.39 | 9.56 | 23.14 |
| Total pentanes | 29.81 | 29.05 | 30.03 | 25.37 |
| Isopentane/n-pentane | 1.66 | 1.34 | 1.26 | 1.15 |

[1] Largely hexanes and higher.

Although various embodiments of the invention have been described, it is to be understood that they are meant to be illustrative only and not limiting. Certain features may be changed without departing from the spirit or scope of the present invention. It is apparent that the present invention has broad application to the conversion of alkane hydrocarbons to higher molecular weight hydrocarbons with concomittant isomerization using a catalytic mass having an alkane dehydrogenation component, an olefin disproportionation component, and an alkane isomerization component. Accordingly, the invention is not to be construed as limited to the specific embodiments or examples discussed but only as defined in the appended claims or substantially equivalents of the claims.

We claim:

1. A process for obtaining relatively high yields of isopentane from butane, hexane, or mixtures thereof which comprises contacting the butane, hexane, or mixtures thereof in a reaction zone at a temperature between 400° and 950° F. with a catalyst containing a platinum group metal on a refractory support as an alkane dehydrogenation component, a Group VI-B metal or metal compound on a refractory support as an olefin disproportionation component, and a crystalline aluminosilicate material as an alkane isomerization component to thereby obtain isopentane from the butane, hexane, or mixtures thereof.

2. A process in accordance with claim 1 wherein the feedstock comprises normal butane.

3. A process in accordance with claim 1 wherein the feedstock comprises normal hexane.

4. A process in accordance with claim 1 wherein the butane, hexane, or mixtures thereof is contacted in the reaction zone at a temperature between about 400° and 850° F. with a catalytic mass containing platinum on alumina as an alkane dehydrogenation component and tungsten oxide on silica as an olefin disproportionation component.

5. A process in accordance with claim 1 wherein the alkane isomerization component comprises a layered crystalline aluminosilicate material.

6. A process in accordance with claim 1 wherein the alkane isomerization component comprises between 0.05 and 15 weight percent chromium on a layered clay-type crystalline aluminosilicate material.

7. A process in accordance with claim 4 wherein the alkane isomerization component comprises between 0.05 and 15 weight percent chromium on a layered clay-type crystalline aluminosilicate material.

References Cited
UNITED STATES PATENTS

| | | | |
|---|---|---|---|
| 2,971,904 | 2/1961 | Gladrow et al. | 208—135 |
| 2,971,903 | 2/1961 | Newtonkinmberlin et al. | 208—119 |
| 3,140,251 | 7/1964 | Plank et al. | 208—120 |
| 3,668,268 | 6/1972 | Mulaskey | 260—676 R |
| 3,668,269 | 6/1972 | Chloupek | 260—676 |
| 3,130,006 | 4/1964 | Rabo et al. | 208—120 |
| 3,140,252 | 7/1964 | Frilette et al. | 208—120 |
| 3,516,925 | 6/1970 | Lawrence et al. | 208—111 |
| 3,409,682 | 11/1968 | Mitsche | 260—666 |
| 3,445,541 | 5/1969 | Heckelsberg et al. | 260—683 |
| 1,687,890 | 10/1928 | Ramage | 260—683.15 |
| 3,280,212 | 10/1966 | Miale et al. | 260—683.65 |
| 3,301,917 | 1/1967 | Wise | 260—683.65 |
| 3,431,316 | 3/1969 | Banks | 260—683 |
| 3,507,931 | 4/1970 | Morris | 260—683.65 |
| 3,446,868 | 5/1969 | Box | 260—676 |

DELBERT E. GANTZ, Primary Examiner

J. M. NELSON, Assistant Examiner

U.S. Cl. X.R.

260—683 A, 683.65